USOO8867516B2

(12) United States Patent
Jung

(10) Patent No.: US 8,867,516 B2
(45) Date of Patent: Oct. 21, 2014

(54) BINARY CDMA IMAGE-TRANSCEIVING SYSTEM DIRECTLY CONNECTED TO AN IMAGE CAPTURE DEVICE

(75) Inventor: Sung-ho Jung, Incheon (KR)

(73) Assignee: HDC Inc., Incheon (KR)

( * ) Notice: Subject to any disclaimer, the term of this patent is extended or adjusted under 35 U.S.C. 154(b) by 143 days.

(21) Appl. No.: 13/695,876

(22) PCT Filed: Oct. 28, 2010

(86) PCT No.: PCT/KR2010/007441
§ 371 (c)(1),
(2), (4) Date: Nov. 2, 2012

(87) PCT Pub. No.: WO2011/142513
PCT Pub. Date: Nov. 17, 2011

(65) Prior Publication Data
US 2013/0057711 A1    Mar. 7, 2013

(30) Foreign Application Priority Data

May 13, 2010    (KR) ........................ 10-2010-0044926

(51) Int. Cl.
*H04N 5/225*    (2006.01)
*H04N 19/61*    (2014.01)
*H04N 19/89*    (2014.01)
*H04N 19/85*    (2014.01)
*H04B 1/69*    (2011.01)

(52) U.S. Cl.
CPC ... *H04N 19/00781* (2013.01); *H04N 19/00933* (2013.01); *H04N 19/00903* (2013.01); *H04B 1/69* (2013.01)
USPC ......... 370/342; 370/270; 370/271; 348/207.1

(58) Field of Classification Search
None
See application file for complete search history.

(56) References Cited

U.S. PATENT DOCUMENTS 6,993,357 B1 *  1/2006  Ito et al. ..................... 455/552.1
(Continued)

FOREIGN PATENT DOCUMENTS

| KR | 10-0615956 B1 | 4/2003 |
| KR | 1020080035894 A | 4/2008 |
| KR | 100858444 | 9/2008 |

(Continued)

*Primary Examiner* — Chi H Pham
*Assistant Examiner* — Shick Hom
(74) *Attorney, Agent, or Firm* — Lexyoume IP Meister, PLLC

(57) ABSTRACT

A binary CDMA image transmission and receiving system directed connected to an image capturing device includes an image transmission unit including: an image capturing device comprising a CCD/CMOS camera module and configured to output a captured digital image signal; an image pre-treatment processing unit configured to process a digital image signal output from the image capturing device to be vivid; a digital image processing unit configured to convert the image signal into a compressible signal; a transmission side A/V codec configured to compress an image and a voice of an output image signal; a transmission side host processor configured to perform a binary CDMA function, a transmission side binary CDMA baseband processor; and an RF transmission unit, and an image receiving unit including: an RF receiving unit configured to receive the transmitted RF signal; a receiver side binary CDMA baseband processor configured to receive and decode the received RF signal; a receiver side host processor; a receiver side A/V codec configured to restore the image and the voice; and an image post-treatment unit configured to output the image signal. The binary CDMA image transmission and receiving system may increase a resolution of an image through a digital processing method, not an analog method, may improve security by being capable of encoding a transmission data, may have an excellent frequency efficiency, may enable a remote distance communication superior to a short range wireless communication, and may enable a low power high speed transmission.

4 Claims, 3 Drawing Sheets

(56) References Cited

U.S. PATENT DOCUMENTS

2007/0189621 A1* 8/2007 Liu .............................. 382/239
2009/0231480 A1* 9/2009 Oyama .................... 348/333.01
2009/0290038 A1* 11/2009 Yamagata et al. ......... 348/222.1

FOREIGN PATENT DOCUMENTS

| KR | 100858444 B1 | 9/2008 |
| KR | 1020090069491 | 7/2009 |
| KR | 1020090069491 A | 7/2009 |

* cited by examiner

BINARY CDMA IMAGE-TRANSCEIVING SYSTEM DIRECTLY CONNECTED TO AN IMAGE CAPTURE DEVICE

TECHNICAL FIELD

The present invention relates to a binary CDMA image transceiving system directly connected to an image capturing device, and more particularly, to a binary CDMA image transceiving system directly connected to an image capturing device in which a security surveillance image may be captured by using a general CCD/CMOS camera and a digital image may be immediately transmitted and output without a signal conversion, thereby achieving a higher speed processing speed, a higher reliability and efficiency, and a greatly improved transmission distance.

BACKGROUND ART

As is well known, a CCTV camera is installed and operated for the purpose of monitoring/management in a vulnerable area, an area of high human traffic, or industrial facility.

However, such a CCTV camera has inconvenience in that a camera needs to be connected to a monitor or a digital video recorder (DVR) with a cable.

In addition, when multiple CCTV cameras are used for monitoring/supervising/management, an installment cost is high and control signal transmission cables for controlling the CCTV cameras are respectively and separately required.

Also, increased wire lines affect an appearance of a facility, and a shortage or a connection defect of the wire line causes a transmission defect, and once the camera is installed, a location of the camera may not be easily changed due to the wire line such that changing a location in which a surveillance camera is installed or additionally installing the camera according to a change in a circumstance or a demand such as, for example, a change of an access path may not be flexibly coped with.

To solve this problem, a surveillance camera and a system thereof are disclosed in which a surveillance function is performed in an analog wireless method by using an image capturing device such as a charge-coupled device (CCD)/complementary metal-oxide semiconductor (CMOS) camera module.

However, although the image capturing device captures an image as digital data, when the image is output from an image data pre-treatment unit, the digital data needs to be converted into an analog composite such that an initial digital image is deteriorated, thereby lowering a resolution.

In addition, a signal may be mixed due to a frequency collision with another surveillance camera, and by almost predominating a frequency of the same frequency band, a greater danger is created such as limitation in the use of a wireless LAN apparatus, etc.

Moreover, the above method is disadvantageous in that a transmission efficiency is lower in a remote distance communication, an encoding function of a data is lower such that a security is weak, and a frequency efficiency is lower such that mutual interference is higher and noise generation is great.

DETAILED DESCRIPTION OF THE INVENTION

Technical Problem

Therefore, the present invention has been made in view of the above-mentioned problems, and an aspect of the present invention is to provide a binary CDMA image transceiving system directly connected to an image capturing device in which an initial digital image obtained through the image capturing device may be directly output into a digital image without an analog conversion, thereby avoiding lowering in resolution, a transmission data may be encrypted by applying a binary CDMA technology, thereby improving security, a reliability of the transmission data may be increased by securing a higher frequency efficiency and a lower signal interference, an image and a voice data may be transmitted and received up to within 500 m without a base station, and an excellent operational efficiency may be achieved with lower noise and by allowing multiple terminals to be simultaneously connected thereto.

Technical Solution

In accordance with an aspect of the present invention, there is provided a binary CDMA image transmission and receiving system directly connected to an image capturing device, including: an image transmission unit including an image capturing device comprising a CCD/CMOS camera module and configured to output a captured digital image signal in a CCIR601 or CCIR656 format; an image pre-treatment processing unit configured to process a digital image signal output from the image capturing device to be vivid; a digital image processing unit configured to convert the image signal processed by the image pre-treatment processing unit into a compressible signal; a transmission side A/V codec configured to compress an image and a voice of an image signal output from the digital image processing unit; a transmission side host processor configured to control the image capturing device, the digital image processing unit, and the transmission side A/V codec and configured to perform a binary CDMA function, an imbedded Linux being mounted on O/S; a transmission side binary CDMA baseband processor configured to encode and binarize an image signal compressed by the transmission side A/V codec under control of the transmission side host processor and convert the compressed image signal into a time division multiple access signal waveform; and an RF transmission unit configured to transmit a modulated signal output from the transmission side binary CDMA baseband processor in an RF signal in a band of 2.4 GHz; and an image receiving unit including: an RF receiving unit configured to receive the RF signal transmitted from the RF transmission unit; a receiver side binary CDMA baseband processor configured to receive, demodulate, and decode the RF signal received from the RF receiving unit; a receiver side host processor configured to control the receiver side binary CDMA baseband processor; a receiver side A/V codec configured to restore the image and the voice by depressing the image signal which is modulated and encoded under control of the receiver side host processor; and an image post-treatment unit configured to output the image and the voice of the image signal restored through the receiver side A/V codec into an analog image signal which is capable of being directly input to a monitor according to a number of devices wirelessly connected thereto.

Here, the image pre-treatment unit of the image transmission unit is configured to process by using a 12 bit AD IC.

Also, a compression method used by the transmission side A/V codec and the receiver side A/V codec is one of M-JPEG, MPEG-4, and H.264.

Further, the RF receiving unit of the image receiving unit is divided, depending on a device used, into a 1:1 receiver (receiving a signal with one receiver from one camera module built with a binary CDMA), a 1:4 receiver (receiving the signal with one receiver from four camera modules built with the binary CDMA), a 1:8 receiver (receiving the signal with one receiver from eight camera modules built with the binary CDMA), and based thereon, the number of the video encoders is determined by the image post-treatment unit.

In addition, the receiver side A/V codec and the image post treatment unit of the image receiving unit are mounted to a main board of a personal computer (PC) and the RF receiving unit, the binary CDMA baseband processor, and the host processor are manufactured in a form of a PC card and mounted to the PC to receive and process the image signal transmitted from the image transmission unit.

Advantageous Effects

According to the present invention, a resolution of an image may be increased through a digital processing method rather than an analog method, a security is improved by enabling encryption of a transmission data, a quality of the transmission data is improved due to an excellent frequency efficiency and a lower interference, a remote distance communication which is superior to other short range wireless communication is possible, and a lower power and higher speed transmission is possible.

MODE FOR CARRYING OUT THE INVENTION

Figure 1:
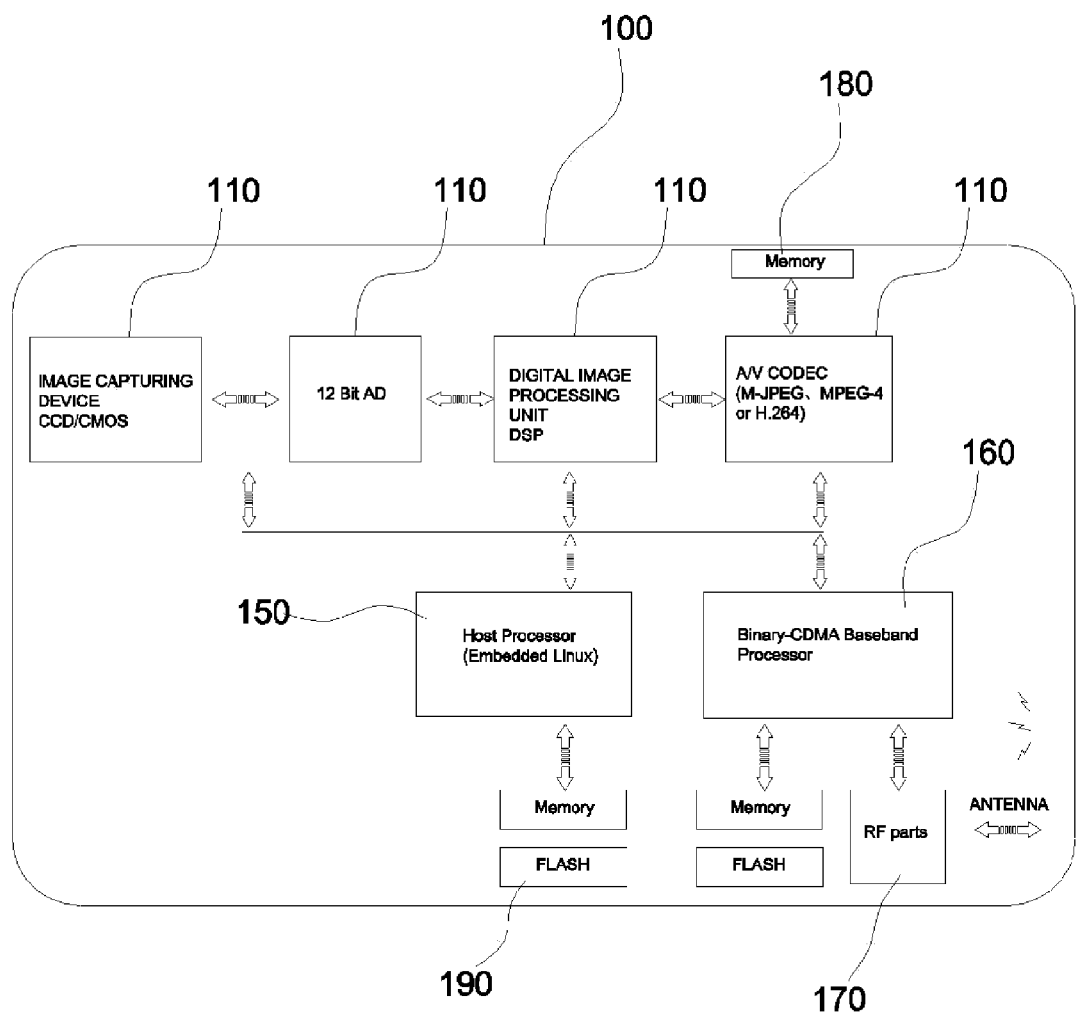
FIG. 1 is a block diagram illustrating an example configuration of an image transmission unit of a system according to the present invention.

Hereinafter, exemplary embodiments of the present invention will be described with reference to the accompanying drawings.

A binary CDMA image transceiving system directly connected to an image capturing device according to the present invention largely comprises an image transmission unit and an image receiving unit.

Also, a wireless communication therebetween is performed in a binary CDMA method.

Here, a binary CDMA is a specified CDMA technology, which is one of wireless communication technologies, and is a personal wireless communication technology which wirelessly connects digital devices to enable a wireless and free exchange of a voice, an image, and a data therebetween.

The binary CDMA wireless technology is superior to Bluetooth, Zigbee, UWB, etc., in various aspects as shown in Table 1 below in a personal wireless communication range and can maintain a constant transmission speed per user regardless of a change of the number of users, thereby having an excellent advantage in transmitting a multimedia.

TABLE 1

|  | Binary CDMA | Bluetooth | Zigbee | UWB | Wireless LAN11n |
| --- | --- | --- | --- | --- | --- |
| Range of use | Indoor/outdoor | Indoor/Proximity | indoor/proximity | indoor/proximity | indoor/outdoor |
| Transmission speed | Maximum 54 M (average 20 Mbps) | 1 Mbps (average 73 Mbps) | 250 Kbps | Maximum 54 Mbps | Maximum 120 Mbps (40 Mbps) |
| Usable frequency | 2.4 GHz-2.248 GHz | 2.4 GHz-2.248 GHz | 2.4 GHz-2.248 GHz | 3.1 GHz-10.6 GHz | 2.4GHz/5GHz |
| Passing Obstacle | O | ^ | X | X | O |
| Image transmission | O | X | X | O | O |
| Retain source technology | O | X | X | X | X |
| Mobility | 80 Km/h | fixed | fixed | fixed | Fixed/low speed |
| Transmission distance (1 cell) | 100-500 m | 10-100 m | 10-50 m | 1 m-10 m (average 3 m) | 500 m |
| Features | *high transmission speed - stop/high speed transmission considering a moving object (maximum 50 Mbps) *mobility - when in motion, (within a range of 100 m) transmission at 80 km/h is possible *short reconnection time - within 1-2 seconds | *low power - use 2.8 v-3.3 v *voice use environment- use multi channel voice using a narrow band width | *low power- use 2.8 v-3.3 v *suitable for purpose of sensor networking and controlling- use in a field of small transmission information and low transmission frequency *voice use environment- use multi channel voice using a narrow band width | *high transmission speed- maximum 480 Mbps *complexity of equipment is low, thereby enabling small size | *high transmission speed- support maximum 104 Mbps *reduce installment cost *reduced relocation cost- when relocated, fast and easy relocation/install ment *flexible use environment- simultaneous use of image and voice |

TABLE 1-continued

|  | Binary CDMA | Bluetooth | Zigbee | UWB | Wireless LAN11n |
|---|---|---|---|---|---|
| Drawback | *low power - 2.8 v-3.3 v *security encoding - using CDMA *flexible use environment *simultaneous use of image and voice *limited application range- useable within a maximum 500- 100 m range | *high battery consumption *low transmission speed *weak security | *complex technology *low transmission speed *low flexibility of S/W stack *weak security | *very short range transmission technology- 1-10 m *interference by other device | *limited mobility - interference in a cell area when in motion *interference between the same equipment *weak security |

In other words, a binary CDMA wireless communication technology utilized by the present invention has advantageous such that the binary CDMA wireless communication technology is strong against noise, similar to CDMA, enables a high speed transmission and a low power consumption, similar to TDMA, has an excellent security because of its capability of encrypting a transmission data, has an excellent frequency efficiency because the binary CDMA can be used simultaneously with WLAN, Bluetooth, and Zigbee, has a low mutual interference, supports (Qos) a multimedia data, supports various transmission speeds of 300 kbps to 64 Mbps, thereby being capable of implementing a wireless network between various digital devices and wirelessly transceiving a high quality image, is capable of transceiving data (an image, a voice) up to within 500 m without a base station, is capable of configuring an individual Ad-hoc network between terminals without an access point (AP), is capable of using up to 40 active devices per one Piconet, and is capable of connecting to up to maximum 250 terminals.

The present invention using the above wireless communication technology may comprise an image transmission unit 100, as shown in FIG. 1.

Referring to FIG. 1, the image transmission unit 100 according to the present invention includes an image capturing device 110.

The image capturing device 110 is a general CCD/CMOS camera module, and in the present invention, a captured digital signal is not analog converted but transmitted as it is in a CCIR601 or CCIR656 format to a digital image processing unit 130 to be output in a digital image.

Here, a general CCD method is a method in which, in an optical system based on an analog circuit, when a light entering through a lens enters into a light collecting apparatus that is called a cell, each cell stores an electric charge of the light and transmits the electric charge to a conversion apparatus to represent a color. In other words, a light passing through the lens passes an aperture to be transmitted to a CCD device instead of a film, thereby generating an image.

Thus, the CCD is divided into a plurality of cells such that, even if a part of cells is damaged, other cells may generate the image, and thus, the CCD method has advantages in that an image quality is superior and a minute expression and a detailed distinction of a color is possible due to a high sensitivity thereof.

Also, in a CMOS method, a transistor is used for a light collecting device and a modulator for converting the electric charge to an electric signal is attached to all pixels which are an element of the image, thereby being capable of reading a data of only a needed part, and a processing speed is faster than the CCD.

Particularly, in the CMOS method, a circuit for converting the captured image data into the digital signal, a memory for storing the data, and a central processing apparatus for controlling a data output or an entire device may be integrated into a chip, thereby achieving a small size and cost reduction.

However, in the CMOS method, the modulator is attached to each pixel so that, if attachment of the modulator is not regular, an image quality and sensitivity may be relatively degraded compared with the CCD, e.g., a defect in the captured image.

In the present invention, a digital data is obtained by directly using the CCD/CMOS camera module and the digital data is processed as it is into an image.

Here, an output terminal of the image capturing device 110 is connected to an image pre-treatment unit 120.

The image pre-treatment unit 120 makes 12 (including 12 or more) arrangements for a transmitted digital color data, instead of an image data in the prior art, by using 12 bit AD IC, thereby increasing a speed thereof to prevent deterioration, and when performing compression by a codec, a color effectiveness and an image quality may be increased.

Namely, the image pre-treatment unit 120 for processing a data into a 12 bit processed digital video format prior to processing a digital image data is directly added to a digital video signal source.

Also, an output terminal of the image pre-treatment unit 120 is connected to a digital image processing unit 130.

The digital image processing unit 130 is a digital signal processor (DSP) for processing the digital signal at a high speed.

Here, the digital image processing unit 130 is a part for processing an image and a voice data such that an image data input from the image capturing device 110 may be compressed by various audio/video (A/V) codecs.

Generally, in the prior art, a video decoding function is performed to decode an analog composite image signal output from the image capturing device such as the CCD camera module into a digital signal appropriate for being input to the A/V codec; however, when a digital image data of 12 bits or more is again processed on the digital data as in the present invention, it is advantageous in that decoding may become efficient, an excellent image data processing speed and a superior decoding function may be supported to secure a high reliability and efficiency in CDMA transmission, and an arrival distance may be greatly increased compared to the prior art.

For example, the arrival distance may be increased by 30% or more compared with the prior art and an image quality and an image sensitivity may be increased from a general CCD CAMERA level (270,000 pixel level) up to MEGAPIXEL level (1.3 M to 3 M), and a deterioration due to a data loss and conversion (analog->digital->analog) may be prevented.

Also, an output of the digital image processing unit 130 is connected to an A/V codec 140.

The A/V codec 140 compresses an audio part and a video part in the digital image processed by the digital image processing unit 130.

In this case, the existing analog data may be reproduced or recorded in a general DVR due to deterioration. However, for binary CDMA transmission, the analog data is again converted into a digital data in an ARM7 format and compressed so that a wireless sensitivity and a receiving image quality may be greatly decreased. However, in the present invention, a digital video signal and a digital data are consistently transmitted form the CCD, and thus, such problem may be solved.

Here, a compression method may be M-JPEG, MPEG-4 or H.264 depending on an application of a product.

Also, the compressed image signal is stored in a memory 180.

Further, the image transmission unit 100 of the system according to the present invention includes a host processor 150, and the host processor 150 is a high performance FPGA processor suitable for performing a binary CDMA function, and preferably is a processor built with an ARM7 core.

Still further, an embedded Linux may be loaded for an operating system O/S and the embedded Linux supports booting according to a booting mode of a CDMA baseband processor 160, and by using the CDMA baseband processor 160 including a binary CDMA wireless communication technology, an application program for transmitting and receiving an image and a voice compression data may be implemented, a wireless arrival distance may be maintained, and a wireless communication quality may be guaranteed among transmitting and receiving devices, particularly, a plurality of devices within a short distance.

In addition, the embedded Linux controls the A/V codec 140 to control a resolution, a compression quality, a compression speed, and various parameters within the image capturing device 110, e.g., components having a function of his, Day & Night, WDR, image reversion, and PTZ (high quality TV based high performance zoom) and facilitate a function thereof, thereby facilitating installation thereof.

Here, in order to perfectly implement the above functions, a size of the transmission data needs to be light and secure and, in case of RF transmission, a deterioration of a data or a data loss needs to be minimized, and an analog data which passes a number of conversion processes in an analog camera cannot avoid such deterioration and loss; however, in the present invention, through a batch processing of the digital data, disadvantages of the prior art may be completely solved.

Also, the application program may be loaded on a flash memory 190 to perform an upgrade and control a differentiated service among clients.

Also, the binary CDMA baseband processor 160 which modulates the image data compressed under control of the host processor 150 by the binary CDMA method and outputs the modulated image data to the RF transmission unit 170 is loaded.

The binary CDMA baseband processor 160 receives an image data (image signal), which is compressed by the A/V codec 140 and stored in the memory 180, and encodes (encrypts) and binarizes the image data and modulates the image data into a time division multiple access signal waveform to be output to the RF transmission unit 170.

Then, the RF transmission unit 170 transmits the RF signal in a band of 2.4 GHz modulated into the binary CDMA.

Figure 2:
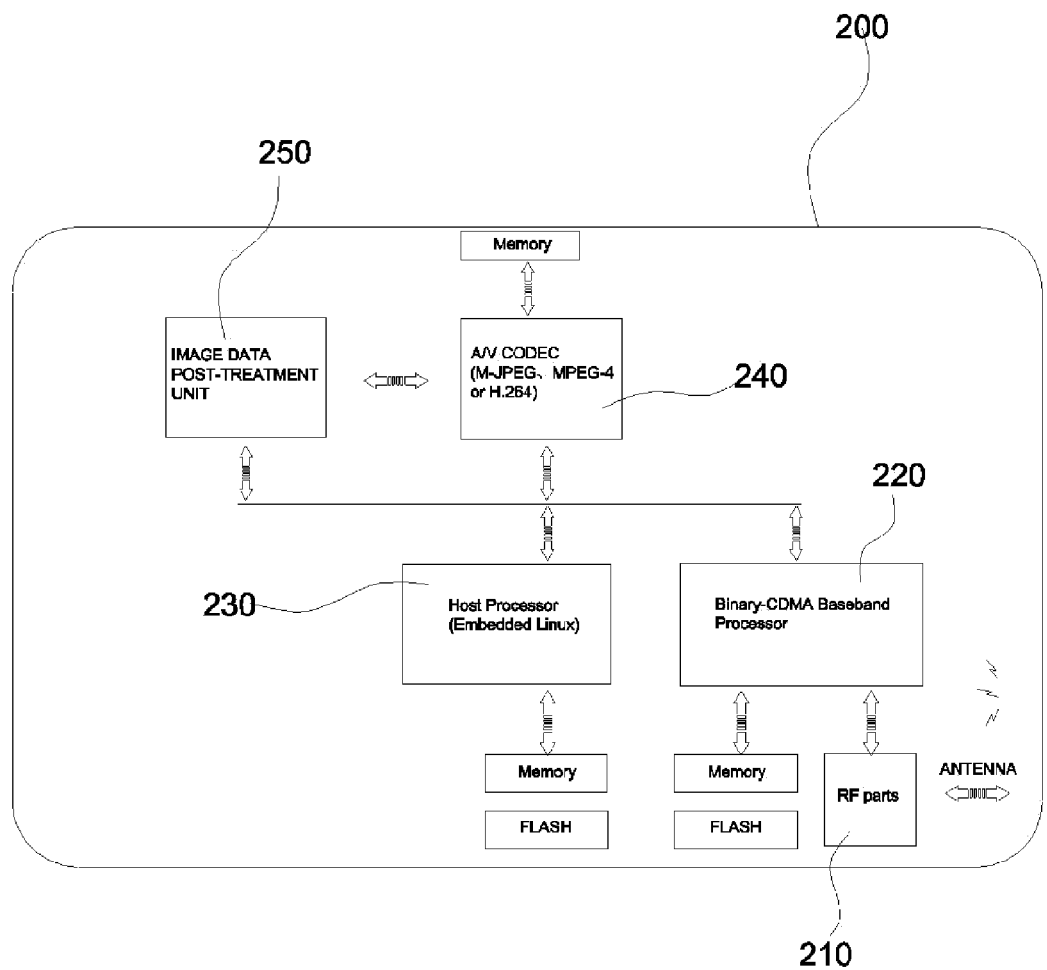
FIG. 2 is a block diagram illustrating an example configuration of an image receiving unit of a system according to the present invention.

On the other hand, the binary CDMA modulation signal transmitted from the RF transmission unit 170 is received through the image receiving unit 200 as shown in FIG. 2.

To this end, the image receiving unit 200 includes an RF receiving unit 210.

The RF receiving unit 210 receives an RF signal in the band 2.4 GHz modulated into the binary CDMA and, depending on the device used, the RF receiving unit 210 may be divided into a 1:1 receiver (receiving a signal with one receiver from one camera module built with the binary CDMA), a 1:4 receiver (receiving a signal with one receiver from four camera modules built with the binary CDMA), a 1:8 receiver (receiving a signal with one receiver from eight camera modules built with the binary CDMA), and based thereon, the number of video encoders is determined by the image post-treatment unit 250, which will be described later.

Therefore, a data carried and transmitted on the ARM7 core is already compressed by the codec such that the data may be directly and simultaneously output, reproduced, compressed and stored without requiring a separate codec processing such that a CDMA wireless system may be implemented by using a codec chip mounted in an existing DVR, thereby increasing the efficiency, lowering a cost and improving a quality.

Also, the image receiving unit 200 is provided with the binary CDMA baseband processor 220 and the host processor 230, which have been described above, wherein the host processor 230 controls the binary CDMA baseband processor 220.

Here, the binary CDMA baseband processor 220 and the host processor 230 demodulate and decode the received modulated signal received from the RF receiving unit 210.

Also, the demodulated and decoded image signal is restored to M-JPEG, MPEG-4 or H.264 according to a compression method at a transmission side through the A/V codec 240.

Here, although the image and the voice are restored to M-JPEG, MPEG-4 or H.264 according to the compression by the transmission CCTV system built with the binary CDMA, since the digital data already compressed is transmitted, the digital data may be stored as it is and a DVR part does not require a separate codec processing, thereby maximizing the efficiency.

Finally, the restored image may produce an image and a voice output into one channel, four channels, or eight channels through the image post treatment unit 250 according to the number of devices wirelessly connected and output the image and the voice to a separate BNC (or RCA) connector.

In this case, an image may be combined and separately outputted to a monitor depending on a need, and an output image signal may be in a form of an analog composite image signal which can be directly input to the monitor.

Therefore, instead of using a conventional method of receiving an analog image and compressing the image by the codec, a DVR structure is implemented in which a pre-compressed data transmitted by the binary CDMA is first stored and output in an analog form according to an application such as a monitor, thereby implementing a digital data batch processing binary CDMA system which maximizes efficiency and greatly reduces a cost.

Figure 3:
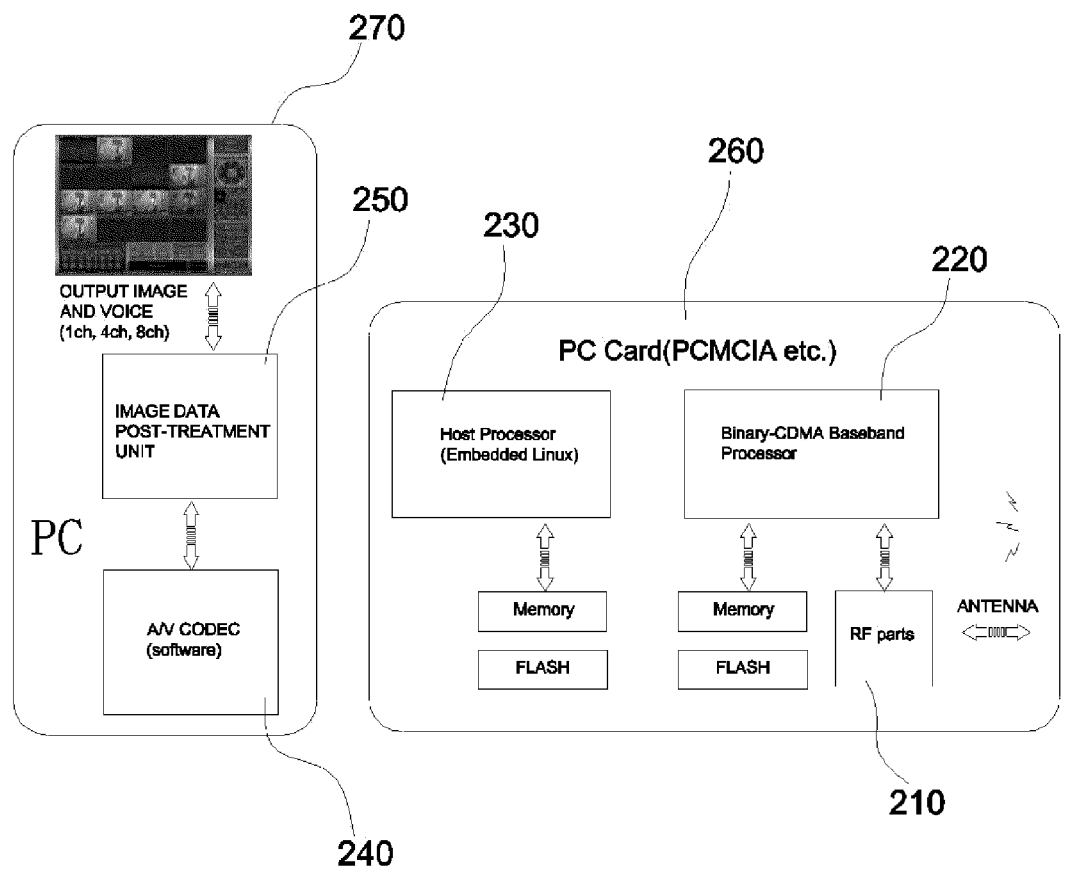
FIG. 3 is a block diagram illustrating another example of an image receiving unit of a system according to the present invention.

In another example, if the image receiving unit 200 is based on a personal computer (PC), as shown in FIG. 3, the RF receiving unit 210, the binary CDMA baseband processor 220, and the host processor 230 may have a form of a PC card (PCMCIA, etc.) 260 and the PC card 260 is mounted on a PC 270, and the A/V codec 240 and the image pre-treatment processing unit 250 are mounted on a main board of the PC 270, which is connected to the PC card 260 such that the present invention may be easily applied not only to a stand-alone application, as described above, but also to a case in which the PC is used as default.

As described above, according to the present invention, an image photographed by the image capturing device built with the binary CDMA is directly processed in the digital method, not the analog method, and transmitted to a desired wireless device through a wireless communication technology of the binary CDMA method so that signal distortion or quality degradation may be avoided while maintaining superior quality and transmission and being capable of transmitting at a high speed and to a long distance, thereby expecting an increase of application thereof.

The invention claimed is:

1. A binary CDMA image transmission and receiving system directly connected to an image capturing device, comprising:
an image transmission unit comprising:
an image capturing device comprising a charge-coupled device with a complementary metal oxide semiconductor, CCD/CMOS, camera module and configured to output a captured digital image signal in a Consultative Committee on International Radio Standard 606 or 656, CCIR601 or CCIR656, format;
an image pre-treatment processing unit configured to process a digital image signal output from the image capturing device to be vivid;
a digital image processing unit configured to convert the image signal processed by the image pre-treatment processing unit into a compressible signal;
a transmission side audio/video, A/V, codec configured to compress an image and a voice of an image signal output from the digital image processing unit;
a transmission side host processor configured to control the image capturing device, the digital image processing unit, and the transmission side A/V codec and configured to perform a binary CDMA function, an imbedded Linux being mounted on operating system, O/S;
a transmission side binary CDMA baseband processor configured to encode and binarize an image signal compressed by the transmission side A/V codec under control of the transmission side host processor and convert the compressed image signal into a time division multiple access signal waveform; and
an RF transmission unit configured to transmit a modulated signal output from the transmission side binary CDMA baseband processor in an RF signal in a band of 2.4 GHz; and
an image receiving unit comprising:
an RF receiving unit configured to receive the RF signal transmitted from the RF transmission unit;
a receiver side binary CDMA baseband processor configured to receive, demodulate, and decode the RF signal received from the RF receiving unit;
a receiver side host processor configured to control the receiver side binary CDMA baseband processor;
a receiver side A/V codec configured to restore the image and the voice by depressing the image signal which is modulated and encoded under control of the receiver side host processor; and
an image post-treatment unit configured to output the image and the voice of the image signal restored through the receiver side A/V codec into an analog image signal which is capable of being directly input to a monitor according to a number of devices wirelessly connected thereto,
wherein the RF receiving unit of the image receiving unit is divided, depending on a device used, into a 1:1 receiver receiving a signal with one receiver from one camera module built with a binary CDMA, a 1:4 receiver receiving the signal with one receiver from four camera modules built with the binary CDMA, a 1:8 receiver receiving the signal with one receiver from eight camera modules built with the binary CDMA, and based thereon, the number of the video encoders is determined by the image post-treatment unit.

2. The binary CDMA image transmission and receiving system of claim 1, wherein the image pre-treatment unit of the image transmission unit is configured to process by using a 12 bit AD IC.

3. The binary CDMA image transmission and receiving system of claim 1, wherein a compression method used by the transmission side A/V codec and the receiver side A/V codec is one of M-JPEG, MPEG-4, and H.264.

4. The binary CDMA image transmission and receiving system of claim 1, wherein the receiver side A/V codec and the image post treatment unit of the image receiving unit are mounted to a main board of a personal computer (PC) and the RF receiving unit, the binary CDMA baseband processor, and the host processor are manufactured in a form of a PC card and mounted to the PC to receive and process the image signal transmitted from the image transmission unit.

* * * * *